United States Patent [19]
Sadr et al.

[11] Patent Number: 6,089,574
[45] Date of Patent: Jul. 18, 2000

[54] BOOT WITH INSERTABLE BUSHING

[75] Inventors: Changize Sadr, North York; George Zoric, Etobicoke, both of Canada

[73] Assignee: Salflex Polymers Ltd.

[21] Appl. No.: 09/037,828

[22] Filed: Mar. 11, 1998

[51] Int. Cl.[7] ................................................. F16J 3/00
[52] U.S. Cl. ........................... 277/636; 277/635; 464/175
[58] Field of Search ................................... 277/635, 636; 464/170, 173, 175

[56] References Cited

U.S. PATENT DOCUMENTS

| Re. 34,341 | 8/1993 | Fukumura et al. ...................... 464/175 |
|---|---|---|
| 4,115,496 | 9/1978 | Krall . |
| 4,334,852 | 6/1982 | Haubert . |
| 4,396,574 | 8/1983 | Kovacs . |
| 4,469,337 | 9/1984 | Yokoi et al. . |
| 4,515,842 | 5/1985 | Kovacs . |
| 4,518,558 | 5/1985 | Anway . |
| 4,639,159 | 1/1987 | Amrath ............................... 277/635 X |
| 4,678,064 | 7/1987 | Adachi et al. . |
| 4,786,272 | 11/1988 | Baker . |
| 4,936,811 | 6/1990 | Baker . |
| 5,295,914 | 3/1994 | Milavec . |
| 5,318,740 | 6/1994 | Sadr . |
| 5,525,288 | 6/1996 | Ninomiya et al. . |
| 5,626,808 | 5/1997 | Miyajima . |
| 5,961,388 | 10/1999 | Breidenbach et al. .............. 464/175 X |

*Primary Examiner*—Anthony Knight
*Assistant Examiner*—Karlena D. Schwing
*Attorney, Agent, or Firm*—Bereskin & Parr

[57] ABSTRACT

An automotive boot for use with a connection such as a constant velocity joint includes a separate boot and a separate bushing. The bushing has an internal configuration which is tri-lobed to contact the surface of one of the mechanical components encapsulated by the boot. The internal surface of the skirt of the boot and the corresponding external surface of the bushing each contain interlocking components, preferentially these are ribs and corresponding grooves. The bushing is slightly larger than the boot to produce an interference fit and the ribs are slightly radially longer than the grooves are deep to deform the ribs when received in the grooves, thereby retaining the bushing without tightening the typical hose clamp and providing an effective seal between the bushing and boot to retain lubricants within the boot in use.

10 Claims, 5 Drawing Sheets

BOOT WITH INSERTABLE BUSHING

FIELD OF THE INVENTION

This invention relates generally to protective boots for automotive components, and particularly to a protective boot for a constant velocity joint.

BACKGROUND OF THE INVENTION

Protective boots used on automobile components such as a boot for a constant velocity joint (CVJ), perform several functions including protecting the joint from outside dirt and debris, as well as maintaining lubricant around the joint. Many protective boots, however, must attach to automotive components which do not have a cylindrical external configuration to which the boot may be clamped. For example, due to the bearing configuration of typical constant velocity joints, the shaft to which one end of the CVJ boot must clamp is lobed, rather than cylindrical. Thus, in order to perform its protective functions properly, a CVJ boot requires a seal or bushing element at one end to be clamped between the boot and the shaft. The bushing may have a tri-lobed internal configuration for cooperation with the joint element.

In use, however, the addition of this extra element increases the ways in which the protective boot may fail. For example, if there is an incomplete seal between the bushing and the boot, lubricant may be allowed to escape from the joint or contaminants allowed to enter.

Accordingly, there is a need for a boot and bushing assembly which provides a suitable external clamping surface and an internal irregular surface which can be configured to meet the requirements of a mechanical structure in association with which the product is to be used. Producing such a product is very difficult using a single molding technique. Thus, it may be desirable to produce the boot with its typical bellows section in a blow molding process. Similarly the bushing with its required internally projecting lobes may best be produced using other techniques such as injection molding. When there is a separate bushing to be used with a separate boot there remains the question of sealing the bushing to the boot. Normally this is accomplished by means of an encircling clamp typically referred to as a hose clamp which clamps the boot against the bushing and the bushing against the underlying mechanical component. This, in turn, means that there are at least three separate items that must be stocked to the automotive assembly plant including a separate boot, a separate bushing, and the encircling clamp.

Accordingly, it would be desirable to produce an assembly of a boot and bushing for shipment to and use at an automotive assembly plant. Such a product would require that the bushing be maintained within the boot prior to attachment to the mechanical component. In addition, such a component would require adequate sealing between the bushing and the boot to ensure that lubricants in the boot would not escape when the boot is in use with an automobile or similar structure.

SUMMARY OF THE INVENTION

The present invention provides a protective boot assembly for an automotive component. The assembly comprises a boot and a bushing. The boot comprises at least one skirt portion, the skirt portion defining inner and outer substantially cylindrical wall surfaces. The inner wall surface of the boot has at least one radially extending first interlocking element, the first interlocking element having a first profile. The bushing comprises a substantially cylindrical outer wall surface. The outer wall surface of the bushing has at least one radially extending second interlocking element, the second interlocking element having a second profile. The first and second interlocking elements have complimentary first and second profiles to facilitate retaining the bushing within the boot.

In a preferred embodiment of the invention, the first and second interlocking elements comprise at least one rib and at least one groove. In a particularly preferred embodiment, the first and second interlocking elements comprise a plurality of ribs and a plurality of grooves.

BRIEF DESCRIPTION OF THE DRAWINGS

For a better understanding of the present invention, and to show more clearly how it may be carried into effect, reference will now be made by way of example to the accompanying drawings.

The drawings show a preferred embodiment of the present invention, in which.

DETAILED DESCRIPTION OF THE PREFERRED EMBODIMENT

Figure 1:
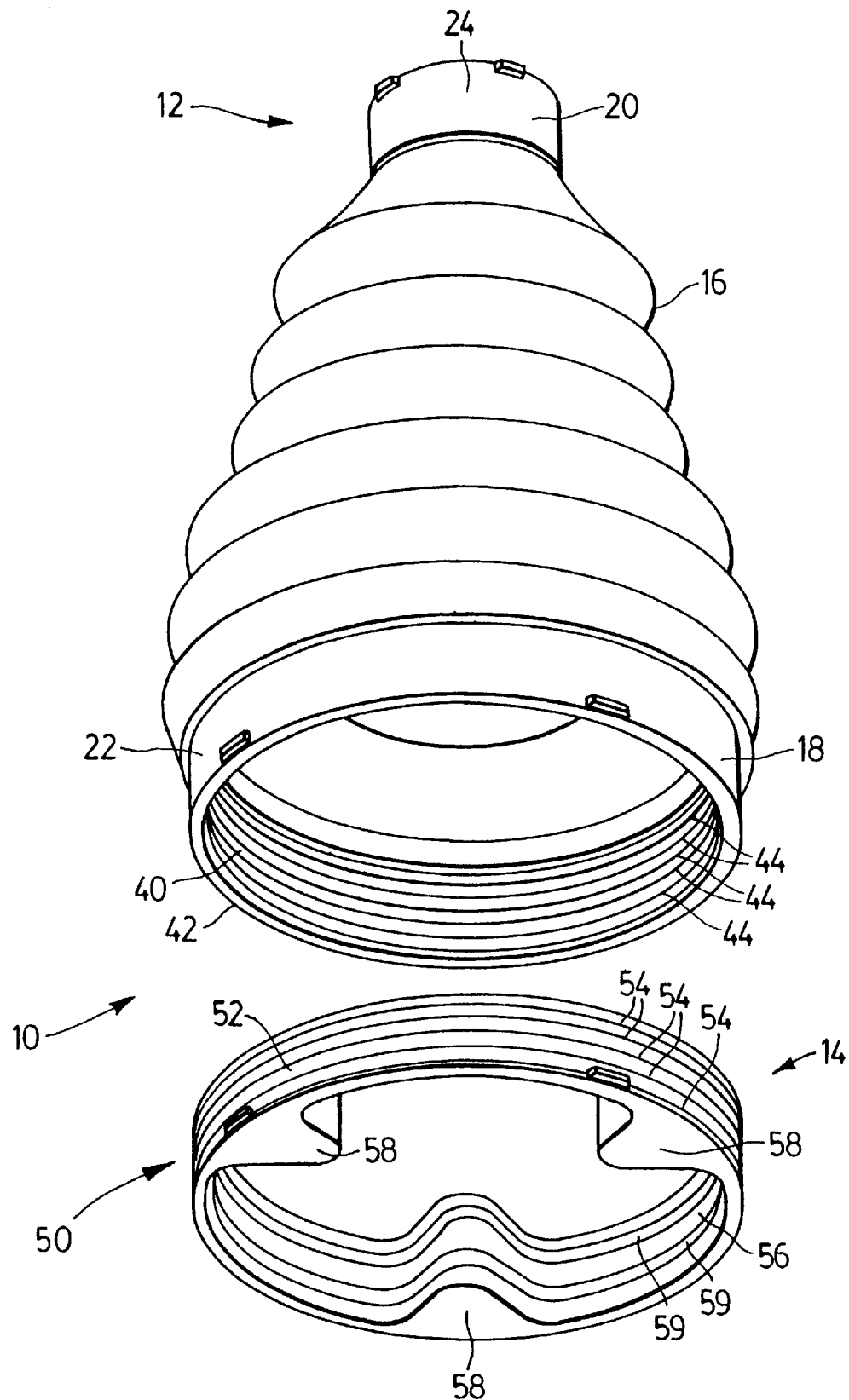
FIG. 1 illustrates the two components of the assembly in the disassembled state.

Referring now to FIG. 1, an automotive boot assembly according to the present invention is illustrated generally at 10. The assembly comprises a boot 12 and a bushing 14.

The boot 12 comprises a bellows portion 16, a first skirt portion 18, and a second skirt portion 20. Each of skirt portions 18 and 20 define a substantially cylindrical outer wall surface 22 and 24 respectively. These substantially cylindrical outer wall surfaces are adapted to receive an encircling clamp, the type usually referred to as hose clamps. The clamps are used to install the assembly on the mechanical element, typically a constant velocity joint. Two such clamps 30 and 32 are shown in the installed position in FIG. 3.

The skirt 18 also defines a substantially cylindrical inner wall surface 40. Wall surface 40 includes a first interlocking element 42. In the preferred embodiment illustrated in FIG. 1, the first interlocking element 42 is comprised of a plurality of ribs 44. The ribs 44 extend radially from the wall surface 40 and peripherally around the wall surface 40.

The bushing 14 is illustrated in FIG. 1. The bushing 14 has an outer substantially cylindrical wall surface 50. The wall surface 50 includes a second interlocking element 52. In the preferred embodiment illustrated, the second interlocking element 52 comprises a plurality of grooves 54. The grooves 54 extend radially from the wall surface 50 and peripherally around the wall surface 50.

The bushing 14 also includes a substantially cylindrical inner wall surface 56. In order to accommodate a lobed structure as is common in the mechanical components making up a constant velocity joint, the generally cylindrical wall surface 56 may include a plurality of radially inwardly projecting lobes 58. Three such lobes are shown in the embodiment illustrated in FIG. 1. The lobes 58 are configured and dimensioned to fit closely with the mechanical component against which the bushing will tighten when the assembly is in use. To further facilitate the interrelation of the bushing with the mechanical component to reduce leakage of fluid contained within the assembly, the wall surface 56 may include one or more ribs or sealing structure 59 to seal against the mechanical component of the constant velocity joint. Two such ribs 59 are illustrated in FIG. 1.

The components of the assembly 10 comprise the boot 12 and the bushing 14. These may be made from any convenient thermoplastic material which is suitable to the method of formation of the components. The materials for the two component portions do not need to be the same. As will be generally known to those skilled in the field, parts having a bellows configuration as is common in boots may most advantageously be made in a blow molding procedure. Blow molding is particularly suitable for making bellows-like structures. One of the difficulties in making blow molded structures, however, arises when attempting to make blow molded structures which have radially inwardly extending projections. A method for making such structures is illustrated in our jointly owned and application Ser. No. 08/694,234, now U.S. Pat. No. 5,900,205, filed Aug. 8, 1996, which is incorporated herein by reference.

The bushing 14 may be manufactured using a number of different molding techniques. One particularly effective method is injection molding. Injection molding is well suited to the manufacture of a relatively thick solid piece having a number of inwardly directed projections such as grooves and ribs and the like. The mold can be opened after the injected plastic has cooled to remove a part having a plurality of grooves and ribs without destroying the shape or profile as desired.

Figure 2:
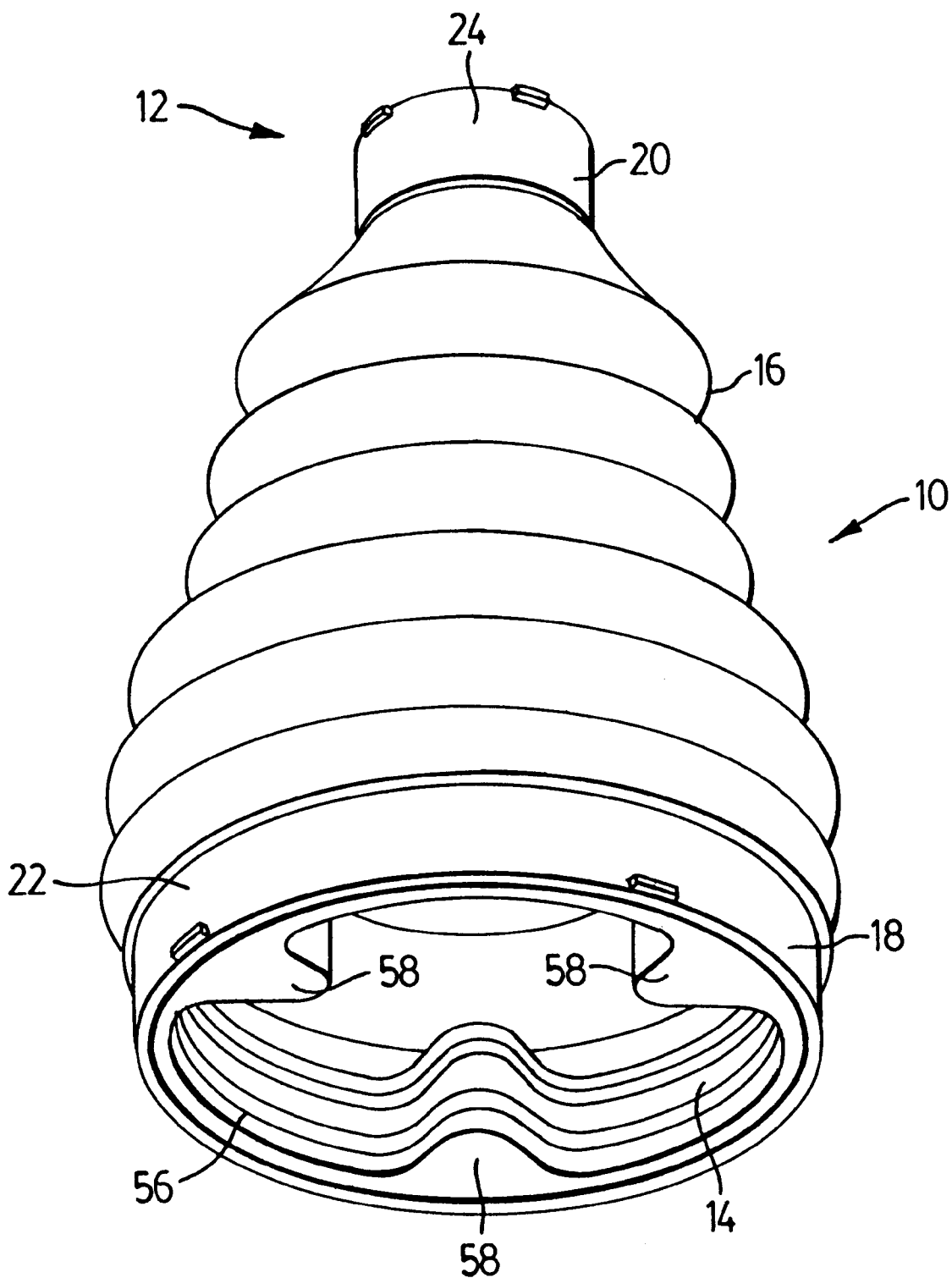
FIG. 2 shows the assembly of FIG. 1 in the assembled state.
Figure 3:
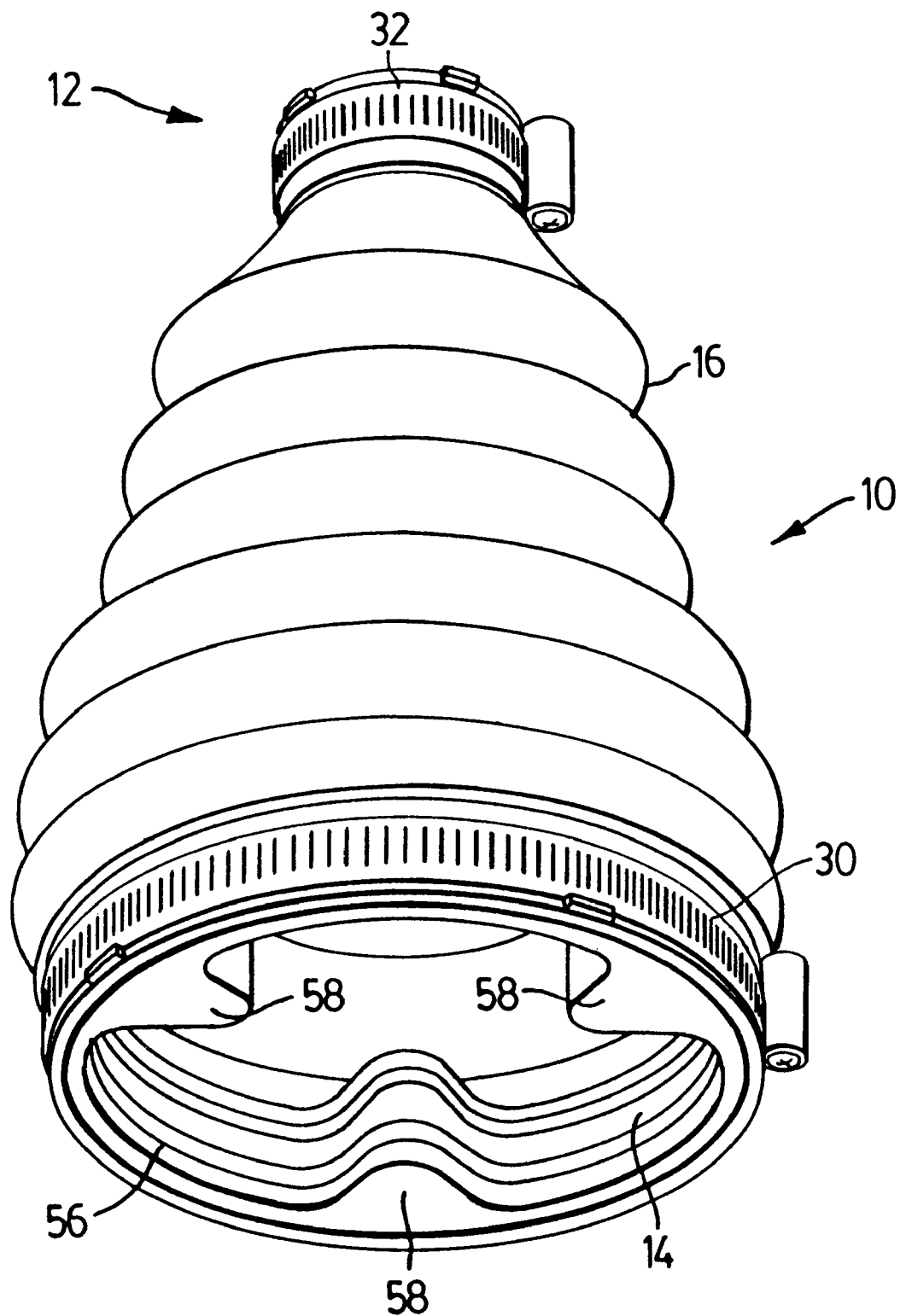
FIG. 3 illustrates the assembly of FIG. 2 with clamping means in place.

In order to assemble the assembly shown in FIGS. 2 and 3, the bushing 14 is simply pressed into the boot 12. The diameter of the substantially cylindrical wall surface 50 of the bushing is closely correlated with the diameter of the substantially cylindrical wall surface 40 of the boot so that the two are in close contact with one another when the pieces are assembled. The most preferable relationship of the respective diameters is discussed more fully below.

When the bushing has been inserted into the boot as shown in FIG. 2, the assembly may then be shipped from the manufacturer to the automotive assembly facility. Alternatively, clamps 30 and 32 may be assembled to the boot assembly at the manufacturer's location. If the hose clamps 30 and 32 are installed at the manufacturing facility, these clamps will not be tightened. The clamps may be tightened slightly to ensure they remain in place. Where this procedure is adopted, there may be other structures to hold the clamps in place even though they are not substantially tightened.

Alternatively, the assembly may be shipped to the automotive assembly facility in the configuration as shown in FIG. 2. Because of the first and second interlocking elements described herein, the bushing is safely retained within the boot which is explained more fully below. When this option is utilized, the hose clamps 30 and 32 will be added to the assembly at the vehicle assembly facility. This will take place contemporaneously with assembling the boot assembly to the mechanical structure, particularly a constant velocity joint. When the hose clamps are in place, they are then tightened. This effectively tightens the boot against the bushing and the bushing against the underlying mechanical structure.

Figure 4:
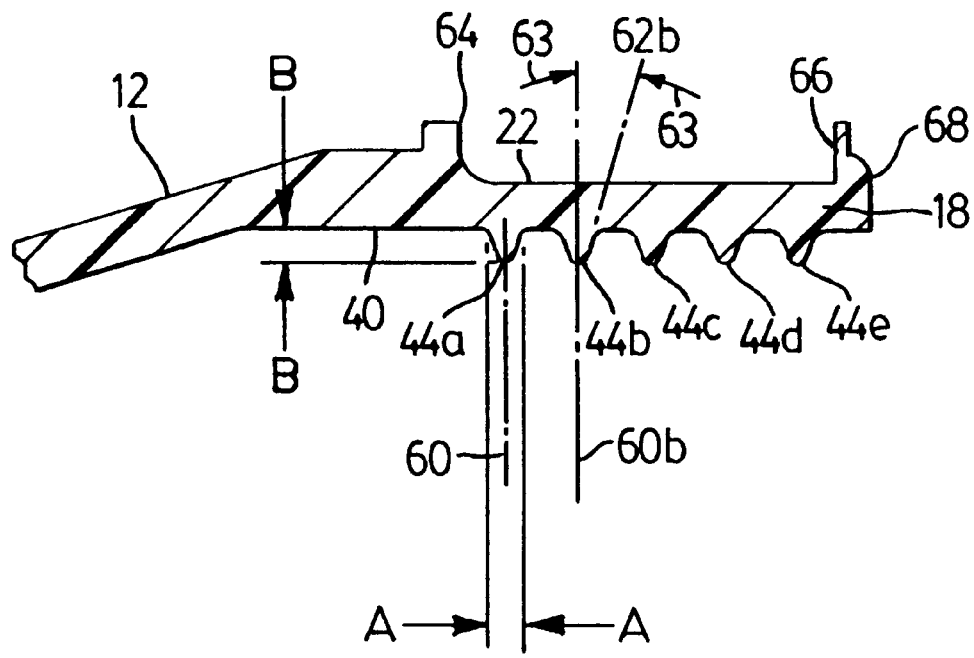
FIG. 4 illustrates a portion of one of the components of FIG. 1 in cross-section showing the first interlocking element.

FIG. 4 illustrates a portion of the skirt 18 of the boot 12, in cross-section. FIG. 4 illustrates five ribs 44a, 44b, 44c, 44d and 44e.

As shown with respect to rib 44a, each rib extends radially inwardly and is generally symmetrical in cross section about a general axis 60. The general axis 60 is substantially perpendicular to the longitudinal axis (not shown) of the boot assembly. The width of rib 44a in the axial direction is designated by the arrows A—A.

With respect to rib 44b, the axis 60b of rib 44b is illustrated. Each side wall of the rib is a substantially flat surface shown by the line 62. The angle between the axis 60b and the line 62b shown by arrows 63—63 in the preferred embodiment is approximately 17.5°.

Each of the ribs 44 extends radially inwardly from the surface 40, the distance B as shown in FIG. 4. The distance B is shown between arrows marked B—B.

As shown in FIG. 4 the substantially cylindrical surface 22 is defined to extend between shoulders 64 and 66. Shoulders 64 and 66 may advantageously be used to maintain clamp 30 in position even though clamp 30 has not been tightly fastened against surface 22.

The boot 12 also comprises a shoulder 68. Shoulder 68 defines a substantially annular flat surface, the purpose of which will be discussed more fully below.

Figure 5:
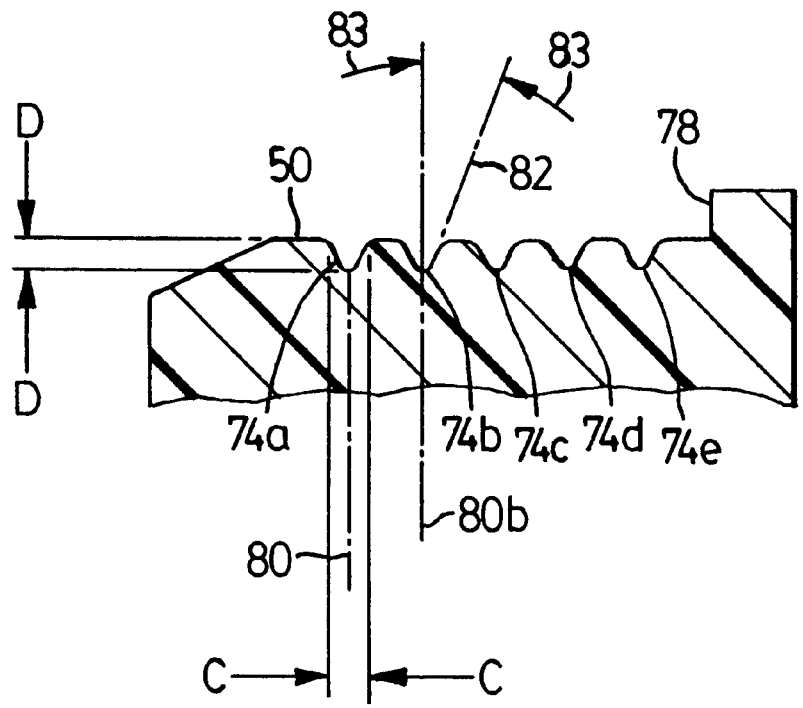
FIG. 5 is a view similar to FIG. 4 but showing a cross-sectional view of a portion of the other component of FIG. 1 showing the second interlocking element.

FIG. 5 illustrates a cross-section of a portion of the bushing 14. The full thickness of the bushing is not illustrated. Rather, FIG. 5 illustrates the outer profile of the surface 50 of the bushing 14. The substantially cylindrical wall surface 50 of the bushing 14 defines a plurality of grooves 74a, 74b, 74c, 74d and 74e. Each of the grooves is generally symmetrical in cross section about a general axis 80. Axis 80 extends perpendicularly to the longitudinal axis of the assembly and is parallel to axis 60. With respect to groove 74a, the longitudinal width of the groove is illustrated as dimension C shown between the arrows C—C. The depth of the grooves as illustrated in connection with groove 74a is the distance D shown between arrows D—D.

With respect to groove 74b, the axis 80b of groove 74b is illustrated. Each side wall of the groove is a substantially flat surface shown by the line 82b. The angle between the axis 80b and the line 82b shown by arrows 83—83 in the preferred emboidment is about 21°.

The bushing 14 also defines a generally flat surface 78. Surface 78 is a generally annular flat surface. When the bushing 14 is installed in the boot 12, the bushing 14 is pushed axially inwardly into the boot. The limit of penetration will be defined by contact of annular surface 78 against corresponding annular surface 68 of the boot 12.

When annular surface 78 contacts annular surface 68, the ribs 44a, 44b, 44c, 44d and 44e will be directly aligned with and received within corresponding grooves 74a, 74b, 74c, 74d and 74e respectively. In each case the axis 60 of one of the ribs will then be directly aligned with the axis 80 of the respective one of the grooves.

Figure 6:
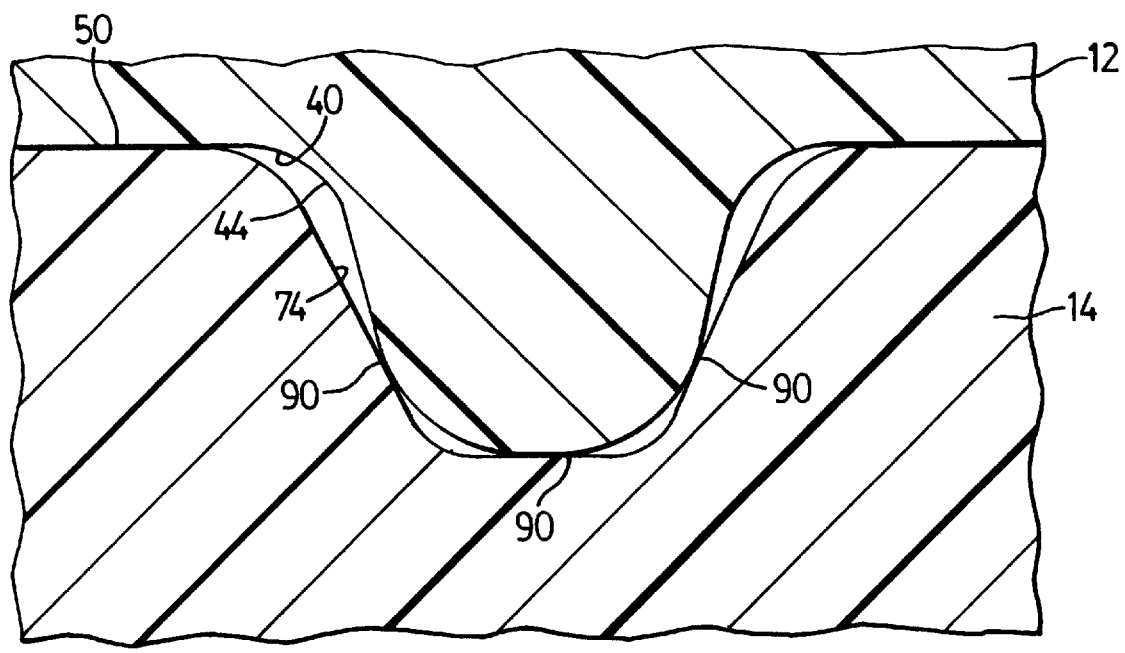
FIG. 6 is an enlarged cross sectional detailed view of one of the ribs of FIG. 4 interlocking with one of the grooves of FIG. 5.

Ribs 44 comprise one of the radially extending interlocking elements while the grooves 74 comprise the other radially extending interlocking element. The manner of interlocking is shown more clearly in FIG. 6. FIG. 6 illustrates the interlocking of a single rib with a single groove.

As part of the interlocking structure, in the preferred embodiment illustrated, the diameter of wall surface 50 is slightly larger than the diameter of the wall surface 40. This means that there is an interference fit between the surface 50 and the surface 40. The distance B, the radial length of the ribs 44, is greater than the distance D, the radial depth of the grooves 74. This, in turn, means that the apex of the rib 44 extends radially inwardly a distance greater than the root of groove 74. Thus, in order to be received within the groove 74, the rib 44 will have to deform slightly. The deformation force is first applied by reason of the interference fit between walls 40 and 50 and the elasticity of the boot and ultimately, additionally, by the hose clamp 30. In order to accommodate the deformation of the rib 44 within the groove 74, the width of the groove, C as shown in FIG. 5, is greater than the width A of the rib as shown in FIG. 4. To further facilitate deformation of the rib, the angle of the groove 74 as shown in FIG. 5, 83—83 is approximately 21° whereas the angle of the rib as shown in FIG. 4, 63—63 is approximately 17½°.

These relative proportions mean that the rib must deform in the radial direction by shortening. Shortening in the radial direction will cause increase in the axial direction of the width of the rib 44 which is accommodated by the slightly wider angle of the groove 74. The action of shortening the rib 44 in the radial direction while expanding the rib 44 in the axial direction provides three discrete areas of contact 90 between the rib 44 and the groove 74. The first area of contact 90 will be at the apex of the rib with the root of the groove. The second and third areas of contact 90 are between the sidewalls of the rib and the sidewalls of the groove, one on either side of the general axis 60 of the rib and 80 of the groove.

Tightening of the hose clamp 30 restricts the diameter of the skirt 18. This further forces the ribs 44 into the grooves 74, further ensuring deformation of the ribs and contact with the ribs and grooves.

With the relative profiles as explained above, each rib, groove combination provides three contact areas of sealing 90. With five ribs as shown in the preferred embodiment in FIGS. 4 and 5, this in turn provides 15 separate areas of surface contact between the bushing and the boot in addition to the contact between the surfaces 40 and 50. This provides an effective labyrinth seal to inhibit passage of lubricant from within the boot when in use between the bushing and the boot.

When in use the assembly utilizes a second hose clamp 32. Typically the component to which the hose clamp 32 attaches the boot is a shaft which may be a drive shaft, steering shaft or the like, which usually has a cylindrical external surface. Thus, typically there is no bushing required at the second end of the boot and the hose clamp merely tightens the cylindrical skirt to the underlying mechanical component, all surfaces in question being generally cylindrical.

In order to ensure that the grooves and ribs align, the spacing of the grooves, in particular, their respective general axes 60, from the shoulder 68 corresponds precisely to the spacing of the ribs with their general axes 80 from the shoulder 78. Accordingly, when the bushing 14 is pushed into the boot 12 there is a "snapping" of the respective ribs into the respective grooves when the shoulder 78 is brought into contact with the shoulder 68. Once that has occurred, bushing 14 is maintained in position as shown in FIG. 2 by the interaction of the plurality of ribs and the plurality of grooves. This in turn means that the assembly will not fall apart under the normal shaking or vibration as might be expected during handling, which may occur between assembly of the bushing into the boot and use of the assembly at a vehicle assembly facility.

As a final means of assisting in assuring adequate deformation of the ribs 44 within the grooves 74, the apex of the ribs may have a slightly smaller radius than the root of the grooves 74.

In one particularly advantageous embodiment and to show the interrelation of the relative sizes of the components, the following two components are illustrated by way of example. In the assembly, the diameter of surface 40 may be 102 mm while the diameter of surface 50 is of the order of 103 mm thereby causing interference. The radially extending length of the ribs 44, distance B, may be in the order of approximately 1.0 mm while the radial depth of the groove 74, distance D, may be of the order of 0.9 mm. The width, distance C, of the grooves may be of the order of 1.1 mm while the width, distance A, of the ribs may be of the order of 1.0 mm. The radius defining the apex of the ribs 44 may be approximately 0.25 mm, while the radius defining the root of the grooves 74 may be of the order of 0.3 mm. The radial thickness of the annular surface 78 may be of the order of 1.5 mm, while the radial thickness of the annual surface 68 may be in the order of 1.3 mm.

While the above description constitutes the preferred embodiment, it will be appreciated that the present invention is susceptible to modification and change without departing from the fair meaning and proper scope of the invention as defined in the accompanying claims.

We claim:

1. A protective boot assembly for an automotive component comprising:

a boot and a bushing, said boot comprising at least one skirt portion, said skirt portion defining inner and outer substantially cylindrical wall surfaces, said inner wall surface having a plurality of radially extending first interlocking elements, said first interlocking elements having a first profile;

said bushing comprising a substantially cylindrical outer wall surface, said outer wall surface of said bushing having a plurality of radially extending second interlocking elements, said second interlocking elements having a second profile;

and wherein said first profile of said first interlocking elements and said second profile of said second interlocking elements have complimentary profiles to facilitate retaining said bushing within said boot;

and wherein said first interlocking elements are ribs and said second interlocking elements are grooves, and wherein each one of said ribs contacts a respective one of said grooves at a plurality of discrete areas of contact.

2. The protective boot assembly of claim 1 wherein each one of said ribs contacts a respective one of said grooves at, at least three discrete areas of contact.

3. The protective boot assembly of claim 1 wherein said ribs are deformed by said grooves when said ribs are located within said grooves.

4. The protective boot assembly of claim 1 wherein the radial length of said ribs is greater than the radial depth of the respective one of said grooves.

5. The protective boot assembly of claim 1 wherein each of said ribs comprises a shape which in cross section includes outwardly extending sidewalls and each of said grooves comprises a shape which in cross-section comprises outwardly extending sidewalls and the angle of said sidewalls of said rib is less than the angle of said sidewalls of said grooves.

6. The protective boot assembly of claim 5 wherein said rib comprises an apex defined by a surface which in cross section is substantially part circular and a respective one of said grooves has a root defined by a surface which in cross section is substantially part circular and the radius of said surface of said rib is smaller than the radius of said surface of said groove.

7. The protective boot assembly of claim 5 wherein said outer cylindrical wall of said boot is adapted to receive and maintain an encircling clamp.

8. The boot assembly of claim 1 wherein said outer cylindrical wall surface of said boot is adapted to receive an encircling clamp.

9. The protective boot assembly of claim 1 wherein the diameter of said outer wall surface of said bushing is slightly greater than the diameter of said inner wall surface of said boot.

10. The protective boot assembly of claim 1 wherein said boot comprises five ribs and said bushing comprises five grooves.

* * * * *